(12) United States Patent  
Suthaharan

(10) Patent No.: US 11,172,027 B2  
(45) Date of Patent: Nov. 9, 2021

(54) SYSTEM AND METHOD FOR MONITORING REMOTE USAGE OF TEST AND MEASURING INSTRUMENTS

(71) Applicant: Rohde & Schwarz GmbH & Co. KG, Munich (DE)

(72) Inventor: Sellathamby Suthaharan, Yateley (GB)

(73) Assignee: Rohde & Schwarz GmbH & Co. KG, Munich (DE)

( * ) Notice: Subject to any disclaimer, the term of this patent is extended or adjusted under 35 U.S.C. 154(b) by 366 days.

(21) Appl. No.: 16/287,471

(22) Filed: Feb. 27, 2019

(65) Prior Publication Data

US 2020/0274930 A1  Aug. 27, 2020

(51) Int. Cl.
| | |
|---|---|
| H04L 29/08 | (2006.01) |
| G06F 9/54 | (2006.01) |
| G06F 11/34 | (2006.01) |
| G06F 11/30 | (2006.01) |
| G06F 9/448 | (2018.01) |
| G06F 9/48 | (2006.01) |
| G06F 16/9538 | (2019.01) |

(52) U.S. Cl.
CPC ............ *H04L 67/125* (2013.01); *G06F 9/448* (2018.02); *G06F 9/4881* (2013.01); *G06F 9/542* (2013.01); *G06F 11/3072* (2013.01); *G06F 11/3476* (2013.01); *G06F 16/9538* (2019.01)

(58) Field of Classification Search
CPC ............ G06F 11/3006; G06F 11/3058; G06F 11/3065; G06F 11/3072; G06F 11/34; G06F 16/9538; G06F 2201/86; G06F 9/448; G06F 9/542; H04L 43/50; H04L 67/125; H04L 41/069; H04L 43/0817

See application file for complete search history.

(56) References Cited

U.S. PATENT DOCUMENTS

| | | | | |
|---|---|---|---|---|
| 5,014,092 A | * | 5/1991 | Kubo | B42C 9/00 399/169 |
| 8,189,490 B2 | | 5/2012 | Michl | |
| 2003/0069752 A1 | * | 4/2003 | LeDain | G16H 30/20 705/2 |
| 2003/0225876 A1 | * | 12/2003 | Oliver | H04L 43/045 709/224 |
| 2009/0066529 A1 | * | 3/2009 | Fukada | G01R 31/371 340/657 |

(Continued)

FOREIGN PATENT DOCUMENTS

| | | |
|---|---|---|
| CN | 205017365 U | 2/2016 |
| JP | 2017225140 A | 12/2017 |

*Primary Examiner* — Tuan C Dao

(74) *Attorney, Agent, or Firm* — Ditthavong, Steiner & Mlotkowski

(57) ABSTRACT

A system for monitoring remote usage of test and measuring instruments is provided. The system comprises a monitoring unit and a plurality of measurement instruments. In this context, each measurement instrument of the plurality of measurement instruments is adapted to record a plurality of events, wherein each event of the plurality of events creates an event identifier and wherein the event identifier is logged in an event log. Additionally, the event identifier triggers a scheduled task which triggers a batch file script on the measurement instrument.

18 Claims, 4 Drawing Sheets

(56) References Cited

U.S. PATENT DOCUMENTS

| | | | |
|---|---|---|---|
| 2012/0054723 A1* | 3/2012 | Jeong | G06F 11/3644 717/129 |
| 2015/0326677 A1* | 11/2015 | Muraoka | G06F 16/24565 709/203 |
| 2018/0338187 A1* | 11/2018 | Ketonen | H04N 21/64738 |
| 2019/0394225 A1* | 12/2019 | Vajipayajula | G06F 16/212 |
| 2020/0026786 A1* | 1/2020 | Cadarette | G06F 16/2379 |
| 2020/0117780 A1* | 4/2020 | Kaladgi | G06F 21/32 |

* cited by examiner

CMW Remote Usage Status Monitor

21/11/2018

IUK2

```
FL-SIMBA    : CONNECTED by Gayle(FL001056) 172.23.168.70, Login time: 2018-11-09, 09:28:40
FL-ODIE     : CONNECTED by (FL001043) 172.23.168.64, Login time: 2018-11-09, 16:45:10
FL-NALA     : IDLE last used by David(FL000308) 172.23.168.68, Logout time: 2018-11-09, 16:30:49
FL-SMITH    : CONNECTED by Steve(FL001043) 172.23.168.64, Login time: 2018-11-12, 07:37:24
fl-simba    : IDLE last used by Sutha(FL000582) 172.23.168.87, Logout time: 2018-11-21, 12:47:01
```

SYSTEM AND METHOD FOR MONITORING REMOTE USAGE OF TEST AND MEASURING INSTRUMENTS

TECHNICAL FIELD

The invention relates to a system and a corresponding method for monitoring remote usage of test and measuring instruments, especially for monitoring a plurality of measurement instruments, which are located in a distant location.

BACKGROUND ART

For monitoring remote usage of measuring instruments, remote login software tools are commonly used, which will only work if user is remotely connected through that software. Since the tool depends on how user is connected to the system, it raises the possibility of connection failure based on the user connection status. There is a growing need of a system and a corresponding method for measuring remote usage of measuring instruments, which does not depend on the user connection status.

U.S. Pat. No. 8,189,490 B2 demonstrates a message analyzer and a corresponding analysis method for the analysis of messages transmitted via service access points on layers of an Open System Interconnection (OSI) reference model with prescribed protocols respective to the layers. Since the individual layers of the OSI reference model communicate by transmission of messages to each other, monitoring of transmitted messages based on the respective protocol results in additional complexity to user.

Accordingly, there is a need to provide a system and a corresponding method for monitoring remote usage of test and measuring instruments, each of which can reduce complexities of remote monitoring and does not depend on how user is connected to the instrument.

SUMMARY OF THE INVENTION

According to a first aspect of the invention, a system for monitoring remote usage of test and measuring instruments is provided. The system comprises a monitoring unit and a plurality of measurement instruments. In this context, each measurement instrument of the plurality of measurement instruments is adapted to record a plurality of events, wherein each event of the plurality of events creates an event identifier and wherein the event identifier is logged in an event log. Additionally, the event identifier triggers a scheduled task which triggers a batch file script on the measurement instrument. Advantageously, the system provides simpler solution for monitoring usage status of measuring instruments by utilizing windows events.

Furthermore, the batch file preferably copies a main executable from a central location to a temporary folder in the measurement instrument and executes the main executable. Moreover, the main executable copies the event log and processes the event log to update a usage status information file. Advantageously, in this manner, the user is not required to use any special software to log in since the main executable is obtained from a central location and is executed within the measurement instrument. Therefore, the invention does not depend on how user is connected to the instrument.

According to a first preferred implementation form of said first aspect of the invention, an event of the plurality of events corresponds to a user logging into the measurement instrument via the monitoring unit. Advantageously, the complexity of remote monitoring is significantly reduced by utilizing windows events, particularly by using remote desktop connection and/or disconnection events corresponding to a user logging into the measurement instrument via remote desktop.

According to a second preferred implementation form of said first aspect of the invention, the event log is saved in the respective measurement instrument. Advantageously, in this manner, the independency on user connection status is further increased.

According to a further preferred implementation form of said first aspect of the invention, a java application creates a pop-up and/or a notification icon in a task bar of the monitoring unit depending on the updated information in the usage status information file. Advantageously, complexity of receiving updated status information by a user is significantly reduced.

According to a further preferred implementation form of said first aspect of the invention, the pop-up and/or the notification icon correspond to a specific user logged into a specific measurement instrument. Advantageously, the independency of the system on user connection status is further increased by providing user specific notifications.

According to a further preferred implementation form of said first aspect of the invention, a webpage displays the usage status information file on the monitoring unit. Additionally, the webpage is updated in regular intervals. Advantageously, the complexity of remote monitoring is further reduced by using a single webpage to display the usage status information of a plurality of measurement instruments.

According to a further preferred implementation form of said first aspect of the invention, the webpage is configured to be accessed by the user by double-clicking the pop-up and/or the notification icon in a task bar of the monitoring unit. Advantageously, the complexity of handling user notifications is significantly reduced.

According to a further preferred implementation form of said first aspect of the invention, a logging event history file is updated comprising all the user logging activities. Additionally, the user logging activities are created whenever a user logs into a measurement instrument. Advantageously, in this manner, the independency on user connection status is further increased.

According to a second aspect of the invention, a method for monitoring remote usage of test and measuring instruments comprising a monitoring unit and a plurality of measurement instruments is provided. The method comprises the steps of recording a plurality of events and creating an event identifier for each event of the plurality of events, logging the event identifier in an event log, and triggering a scheduled task which triggers a batch file script on the measurement instrument. Advantageously, the method provides simpler solution for monitoring usage status of measuring instruments by utilizing windows events. The method further comprises the steps of copying a main executable from a central location to a temporary folder in the measurement instrument and executing the main executable, and copying and processing the event log to update a usage status information file. Advantageously, in this manner, user is not required to use any special software to log in since the main executable is obtained from a central location and is executed within the measurement instrument. Therefore, the invention does not depend on how user is connected to the instrument.

According to a first preferred implementation form of said second aspect of the invention, an event of the plurality of events corresponds to a user logging into the measurement instrument via the monitoring unit.

Advantageously, the complexity of remote monitoring is significantly reduced by utilizing windows events, particularly by using remote desktop connection and/or disconnection events corresponding to a user logging into the measurement instrument via remote desktop.

According to a second preferred implementation form of said second aspect of the invention, the event log is saved in the respective measurement instrument. Advantageously, in this manner, the independency on user connection status is further increased.

According to a further preferred implementation form of said second aspect of the invention, a java application creates a pop-up and/or a notification icon in a task bar of the monitoring unit depending on the updated information in the usage status information file. Advantageously, complexity of receiving updated status information by a user is significantly reduced.

According to a further preferred implementation form of said second aspect of the invention, the pop-up and/or the notification icon correspond to a specific user logged into a specific measurement instrument. Advantageously, the independency on user connection status is further increased by providing user specific notifications.

According to a further preferred implementation form of said second aspect of the invention, a webpage displays the usage status information file on the monitoring unit. Additionally, the webpage is updated in regular intervals. Advantageously, the complexity of remote monitoring is further reduced by using a single webpage to display the usage status information of a plurality of measurement instruments.

According to a further preferred implementation form of said second aspect of the invention, the webpage is configured to be accessed by the user by double-clicking the pop-up and/or the notification icon in a task bar of the monitoring unit. Advantageously, the complexity of handling user notifications is significantly reduced.

According to a further preferred implementation form of said second aspect of the invention, a logging event history file is updated comprising all the user logging activities. Additionally, the user logging activities are created whenever a user logs into a measurement instrument. Advantageously, in this manner, the independency of the system on user connection status is further increased.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
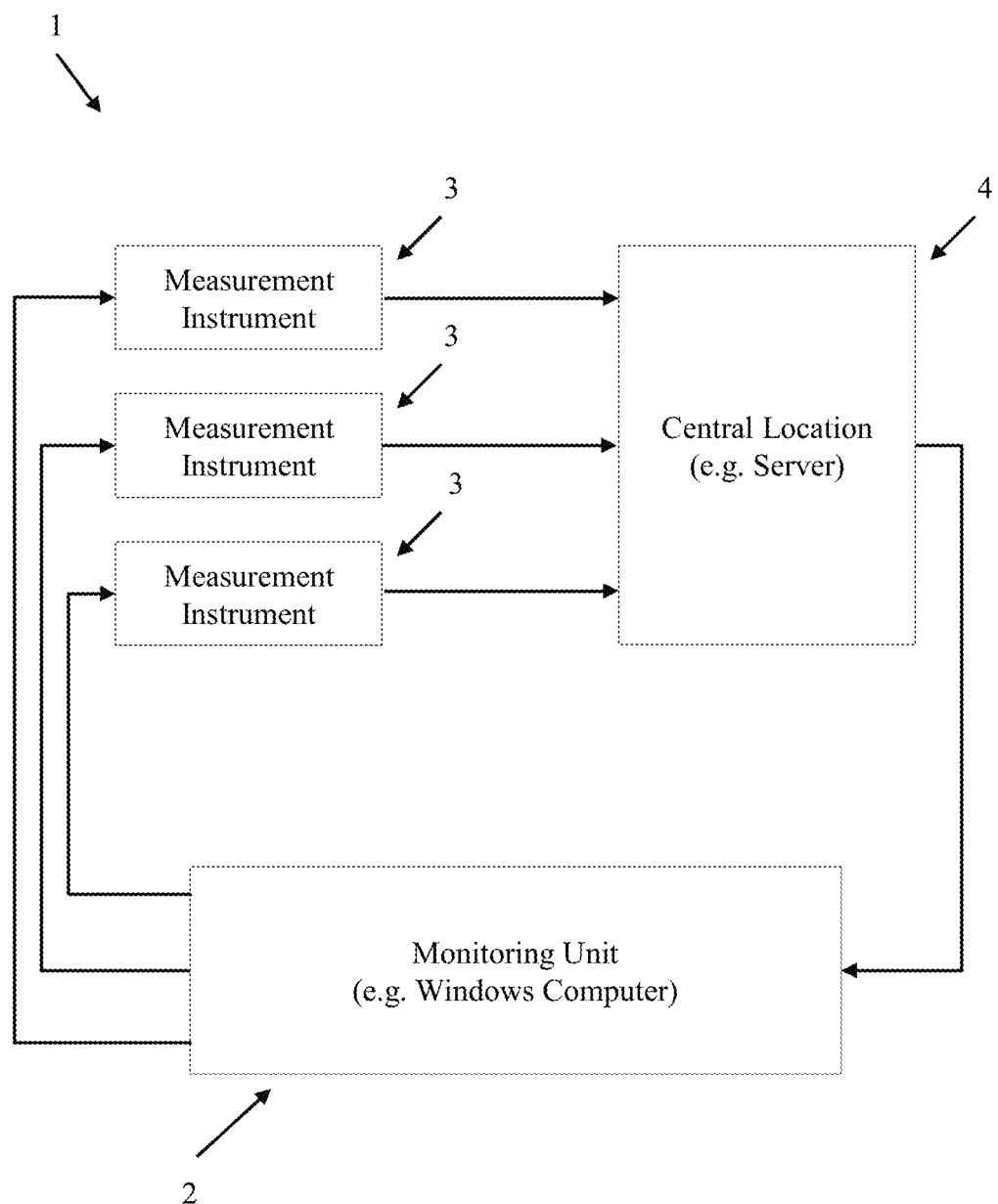
FIG. 1 shows an embodiment of the system for monitoring remote usage of test and measuring instruments according to the first aspect of the invention.

First, we demonstrate the general construction and function of an embodiment of the system of the first aspect of the invention, along FIG. 1. Along FIG. 2, the embodiment of the system according to the first aspect of the invention is described in detail. Finally, with regard to the flow chart of FIG. 5, an embodiment of the method according to the second aspect of the invention is described.

Reference will now be made in detail to the embodiments of the present invention, examples of which are illustrated in the accompanying drawings. However, the following embodiments of the present invention may be variously modified and the range of the present invention is not limited by the following embodiments.

In FIG. 1, an embodiment of the system for monitoring remote usage of test and measuring instruments according to the first aspect of the invention is shown. The system comprises a monitoring unit 2 and a plurality of measurement instruments 3. The monitoring unit is connected to each of the measurement instruments 3 of the plurality of measurement instruments. Each of the measurement instrument 3 of the plurality of measurement instrument is further connected to a central location 4. Moreover, the central location is connected to the monitoring unit 2. The monitoring unit 2 can be a form of windows operated computer. The measurement instrument 3 can be a computer and/or a test instrument such as Applicant's instrument CMW. Furthermore, the central location 4 can be a form of shared directory of a server.

The connections that are illustrated hereby can be wireless or wired data communication links.

In this context, each measurement instrument 3 of the plurality of measurement instrument is adapted to record a plurality of events, wherein each event of the plurality of events creates an event identifier, and wherein the event identifier is logged in an event log. Additionally, the event identifier triggers a scheduled task that triggers a batch file script on the measurement instrument, which is further explained along FIG. 2.

Preferably, the batch file copies a main executable from a central location 4 to a temporary folder in the measurement instrument 3 and executes the main executable. Additionally, the main executable copies the event log and processes the event log to update a usage status information file.

Figure 2:
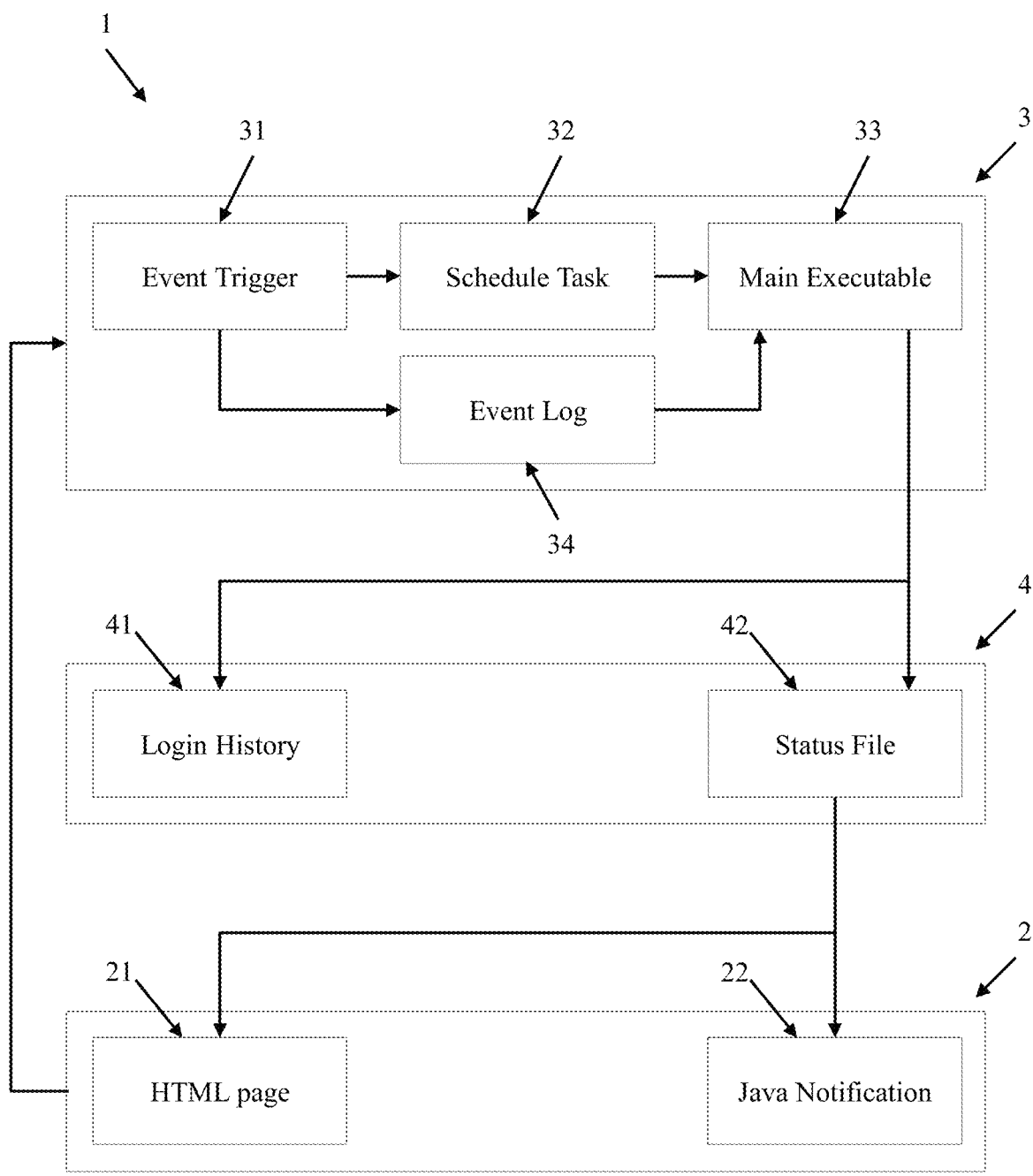
FIG. 2 shows a more detailed view of the embodiment of the system for monitoring remote usage of test and measuring instruments according to the first aspect of the invention.

In FIG. 2, a more detailed view of the embodiment of the system for monitoring remote usage of test and measuring instruments according to the first aspect of the invention is shown. Here, interfaces for monitoring usage of test and measuring instruments are illustrated in greater detail.

The measurement instrument 3 records an event on the event trigger interface 31, which corresponds to the remote desktop connection triggered event of the monitoring unit 2. It is to be noted, an event of the plurality of events represents a user log in attempt into the measurement instrument 3 via the monitoring unit 2.

In addition, each respective event identification created by each of the triggered event is logged in the event log 34. Each of the corresponding event identification further triggers a schedule task 32 to run a batch file script on the measurement instrument 3. The batch file script copies a main executable 33 from the server 4 and executes the main executable. The main executable 33 further copies the event log 34 to a status file 42 within the server 4. For each new event triggered within the measurement instrument 3, the main executable 33 updates the status file 42 periodically and stores the previous login data into a login history log file 41 within the server 4.

For monitoring remote usage, a HTML page interface 21 is provided on the monitoring unit where users can monitor the present connection status of all measurement instruments 3 based on the status file 42 of the server 4. Additionally, a Java notification interface 22 is also included within the monitoring unit 2 that notifies users whenever a connection status of a measurement instrument 3 changes. In this context, the Java notification interface 22 provides a real time notification in form of a pop-up and/or a notification icon in a task bar of the monitoring unit 2 and the user can execute this notification by double-clicking to access the HTML page 21.

Preferably, the directory path of the central location 4, which is shared among the users and the measurement instruments 3 is set before performing the monitoring tasks. By way of example, if the shared location name is "CMWstatus", the following parameter is required to be adjusted specifically:

Parent directory name: If the shared location represents the directory "K:\PRG\CMWstatus", the parent directory shall be set as "K:\PRG\".

Additional provisions are included within the system 1 by means of setting adjustments, which are particularly advantageous for user to handle the monitoring unit 2 in a friendlier manner. For instance, User names: The monitoring device can display the list of all possible users who could remote login to the measurement instruments if the user names are listed in specific list "UserHostNamesList.txt" file.

Log file settings: Additional settings are provided to configure the maximum size of the log files.

Figures 3, 4:
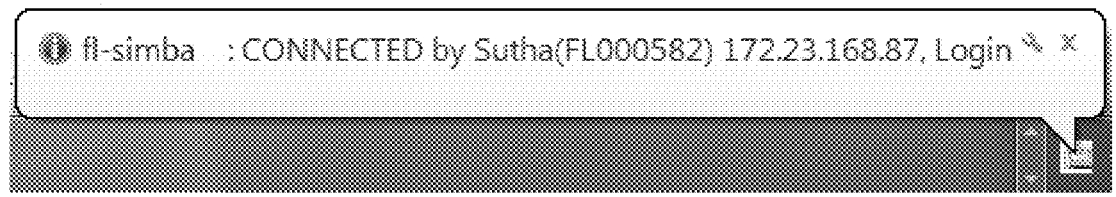
FIG. 3 shows a representation of the webpage displaying status of all measurement instruments by way of example.
FIG. 4 shows a representation of the notification icon on the task bar of the monitoring device by way of example.

In FIG. 3, a representation of the webpage is shown by way of example. It is advantageous that a single HTML page can display the usage status information of all measurement instruments. Once executed, the webpage refresh itself to provide up to date connection status.

In FIG. 4, a representation of the notification icon on the task bar of the monitoring device is shown by way of example. User may also open the HTML page illustrated in FIG. 3 by double clicking on the notification icon. The notification can be terminated by right clicking the icon and by pressing the exit button.

Figure 5:
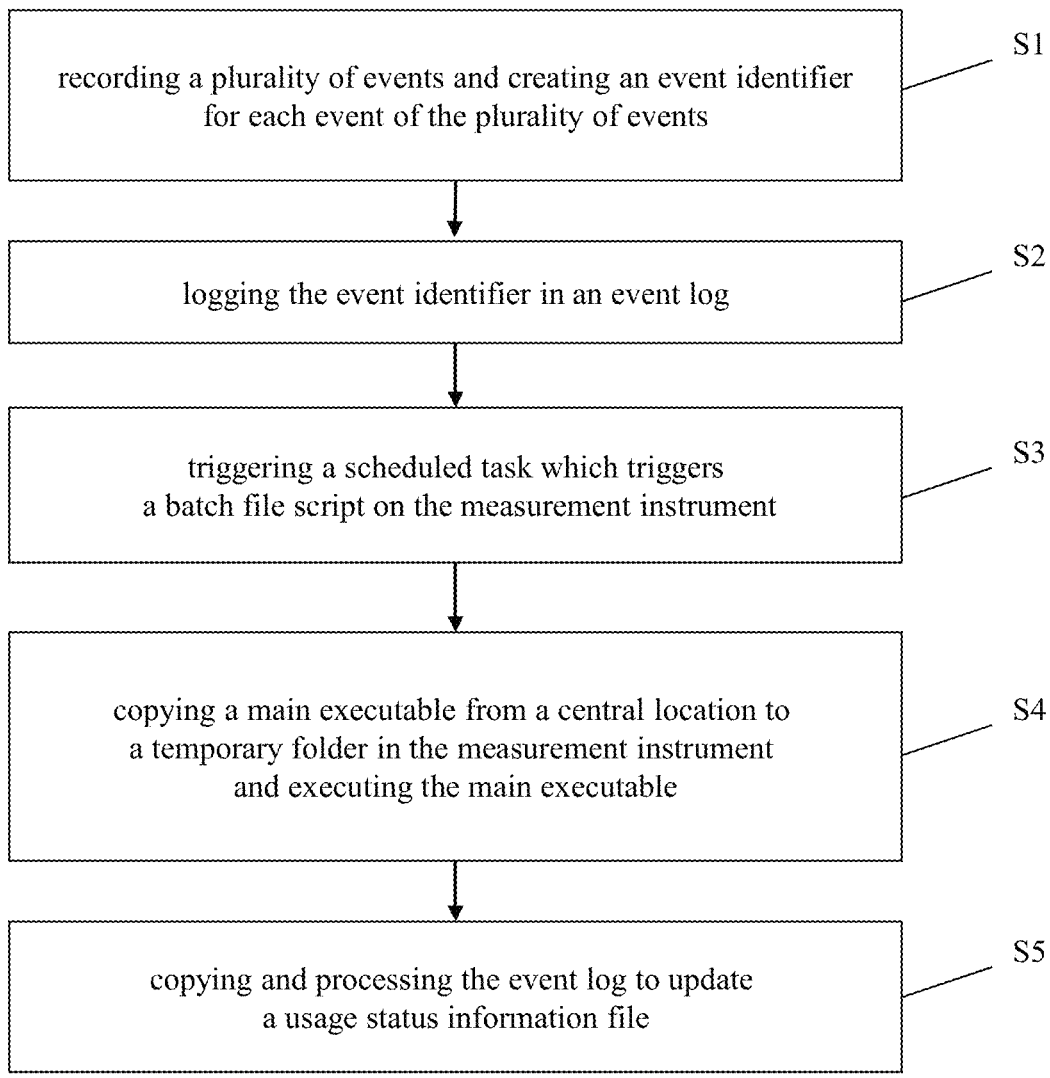
FIG. 5 shows an embodiment of the method for monitoring remote usage of test and measuring instruments according to the second aspect of the invention.

In FIG. 5, an embodiment of the system for monitoring remote usage of test and measuring instruments according to the second aspect of the invention is shown. In a first step S1, a plurality of events are recorded and for each event of the plurality of events, an event identifier is created. In a second step S2, the event identifier is logged in an event log. In a third step S3, a scheduled task is triggered which further triggers a batch file script on the measurement instrument.

In a fourth step S4, a main executable is copied from a central location to a temporary folder in the measurement instrument and is executed. In a final fifth step S5, the event log is copied and processed to update a usage status information file.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for monitoring remote usage of test and measuring instruments comprising:
   a monitoring unit, and
   a plurality of measurement instruments,
   wherein each measurement instrument of the plurality of measurement instruments is adapted to record a plurality of events,
   wherein each event of the plurality of events creates an event identifier,
   wherein the event identifier is logged in an event log,
   wherein the event identifier triggers a scheduled task which triggers a batch file script on the measurement instrument,
   wherein the batch file copies a main executable from a central location to a temporary folder in the measurement instrument and executes the main executable, and
   wherein the main executable copies the event log and processes the event log to update a usage status information file.

2. The system according to claim 1, wherein an event of the plurality of events corresponds to a user logging into the measurement instrument via the monitoring unit.

3. The system according to claim 1, wherein the event log is saved in the respective measurement instrument.

4. The system according to claim 1, wherein a java application creates a pop-up and/or a notification icon in a task bar of the monitoring unit depending on the updated information in the usage status information file.

5. The system according to claim 4, wherein the pop-up and/or the notification icon correspond to a specific user logged into a specific measurement instrument.

6. The system according to claim 1,
   wherein a webpage displays the usage status information file on the monitoring unit, and
   wherein the webpage is updated in regular intervals.

7. The system according to claim 6, wherein the webpage is configured to be accessed by the user by double-clicking the pop-up and/or the notification icon in a task bar of the monitoring unit.

8. The system according to claim 1, wherein a logging event history file is updated comprising all the user logging activities.

9. The system according to claim 8, wherein the user logging activities are created whenever a user logs into a measurement instrument.

10. A method for monitoring remote usage of test and measuring instruments comprising a monitoring unit and a plurality of measurement instruments comprises:
    recording a plurality of events and creating an event identifier for each event of the plurality of events,
    logging the event identifier in an event log, triggering a scheduled task which triggers a batch file script on the measurement instrument, copying a main executable from a central location to a temporary folder in the measurement instrument and executing the main executable, and copying and processing the event log to update a usage status information file.

11. The method according to claim 10, wherein an event of the plurality of events corresponds to a user logging into the measurement instrument via the monitoring unit.

12. The method according to claim 10, wherein the event log is saved in the respective measurement instrument.

13. The method according to claim 10, wherein a java application creates a pop-up and/or a notification icon in a task bar of the monitoring unit depending on the updated information in the usage status information file.

14. The method according to claim 13, wherein the pop-up and/or the notification icon correspond to a specific user logged into a specific measurement instrument.

15. The method according to claim 10,
wherein a webpage displays the usage information file on the monitoring unit, and
wherein the webpage is updated in regular intervals.

16. The method according to claim 15, wherein the webpage is configured to be accessed by the user by double-clicking the pop-up and/or the notification icon in a task bar of the monitoring unit.

17. The method according to claim 10, wherein a logging event history file is updated comprising all the user logging activities.

18. The method according to claim 17, wherein the user logging activities are created whenever a user logs into a measurement instrument.

* * * * *